United States Patent [19]

Häbich et al.

[11] Patent Number: 4,739,731
[45] Date of Patent: Apr. 26, 1988

[54] METHOD FOR MEASURING AND CONTROLLING OF OPERATING DATA OF INTERNAL COMBUSTION ENGINES

[75] Inventors: Andreas Häbich; Bernhard Mutschler, both of Gerlingen, Fed. Rep. of Germany

[73] Assignee: Robert Bosch GmbH, Stuttgart, Fed. Rep. of Germany

[21] Appl. No.: 852,810
[22] PCT Filed: Jul. 25, 1985
[86] PCT No.: PCT/DE85/00250
§ 371 Date: Feb. 21, 1986
§ 102(e) Date: Feb. 21, 1986
[87] PCT Pub. No.: WO86/00961
PCT Pub. Date: Feb. 13, 1986

[30] Foreign Application Priority Data

Aug. 1, 1984 [DE] Fed. Rep. of Germany ....... 3428371

[51] Int. Cl.$^4$ ............................................. F02M 39/00
[52] U.S. Cl. .................................. 123/494; 123/501; 123/357
[58] Field of Search ............... 123/494, 500, 501, 357, 123/358, 359

[56] References Cited

U.S. PATENT DOCUMENTS

| | | | |
|---|---|---|---|
| 4,419,212 | 12/1983 | Dietz | 123/494 |
| 4,502,438 | 3/1985 | Yasuhara | 123/494 |
| 4,515,132 | 5/1985 | Anderson | 123/494 |

FOREIGN PATENT DOCUMENTS

| | | | |
|---|---|---|---|
| 2802202 | 1/1978 | Fed. Rep. of Germany. | |
| 2935725 | 9/1985 | Fed. Rep. of Germany. | |
| 2323895 | 4/1977 | France | 123/494 |
| 1512213 | 5/1978 | United Kingdom | 123/494 |

*Primary Examiner*—Carl Stuart Miller
*Attorney, Agent, or Firm*—Michael J. Striker

[57] ABSTRACT

A method of measuring and/or controlling operating data, like soot content, engine speed, initiation of injection, and exhaust gas return of internal combustion engines, the method including the steps of ionizing gases at high temperatures in a combustion chamber of an internal combustion engine that experiences combustion operations, the ionized gases having components with the lowest ionization potentials, applying a current and a voltage to the ionized gases, obtaining electrical measuring signals of the current or voltage indicative of an electrical conductivity of the ionized gases, integrating the electrical measuring signals to define a curve plot of the electrical conductivity, detecting a quantity of components of the ionized gases that have the lowest ionization potentials based on the integrated electrical measuring signals, the detected quantity of components being associated with a portion of the electrical measuring signals and being indicatives of an amount of soot formed during each of the combustion operations, and controlling at least one of the operating data of the internal combustion engine based on the portion of the integrated electrical measuring signals associated with the detected quantity of components.

6 Claims, 1 Drawing Sheet

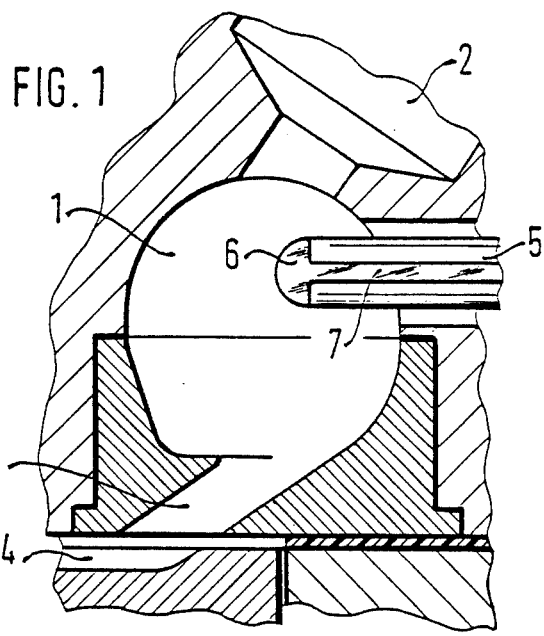
FIG. 1
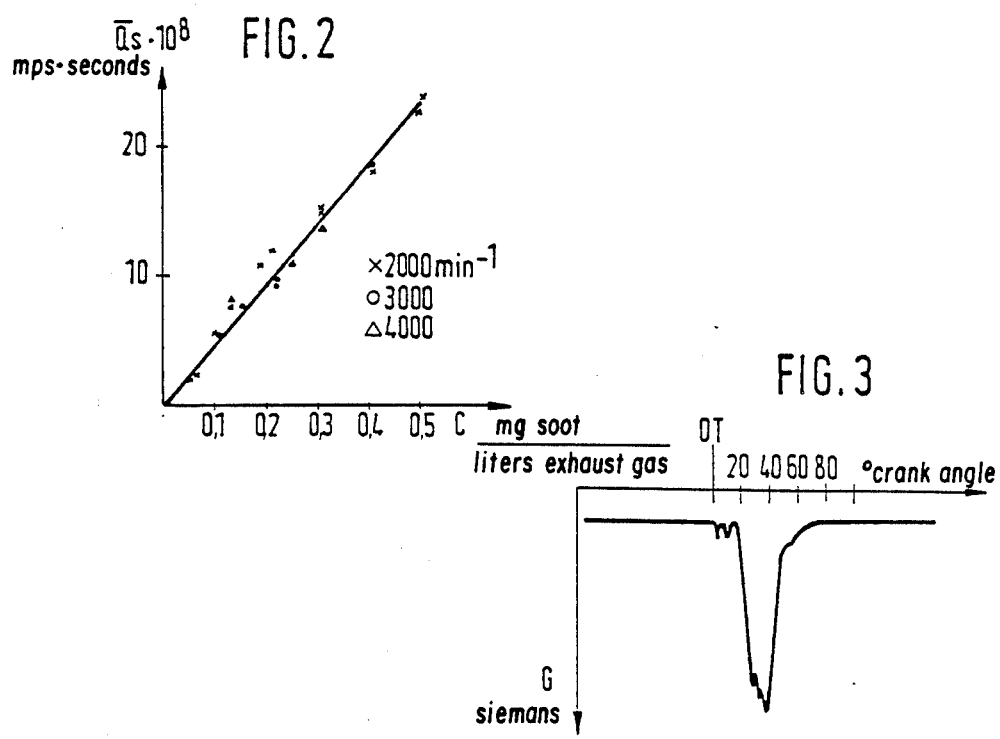
FIG. 2
FIG. 3

METHOD FOR MEASURING AND CONTROLLING OF OPERATING DATA OF INTERNAL COMBUSTION ENGINES

BACKGROUND OF THE INVENTION

The invention is relates to a method of measuring operating data of internal combustion engines. Ion current probes are known which serve, for example, to determine and control the point in time of ignition in Otto-motors (DE-OS No. 29 35 725) or for picking up pressure fluctuations to recognize knocking combustions (DE-OS No. 28 02 202). These probes operate with high field intensities of over 1000 V/cm and are not suitable for determining harmful materials in the combustion gas, because of their other features.

SUMMARY OF THE INVENTION

In contrast thereto the method in accordance with the invention and the characterizing features of the main claim is advantageous by providing a rapid and specific pick up of an important harmful component of the internal combustion engine. It operates with field intensities of below 300 V/cm and due to the high sensitivity and reaction speed the method is able to dissolve individual combustion operations and thereby supply information about combustion initiation, duration of combustion and combustion operation or missing combustion. The sensor required for performing the method is a modified glow pin spark plug which is already available in smaller Diesel engines. In directly injecting Diesel motors, which do not have such start assistance, it is possible to modify the injection nozzle to such an extent that probe operations can be picked up, so that additional bores for specific probes are not required.

Particularly advantageous is the picking up of soot which is present in Diesel engines, the possibility of the contactless speed measurement of internal combustion engines, the possibility for controlling the initiation of the injection in Diesel engines, as well as the possibilities of controlling exhaust gas return (EGR).

Gas ions are formed by the high temperatures which prevail in the combustion operations in internal combustion engines, as well as by energy rich radiation which provide an electric conductivity for the highly heated gases which is directly proportional to the charge carrier density. Which type of charge carriers are generated depends on the temperature and on the ionisation potentials of the molecules which are present. It is basically possible to detect certain gas components by the conductivity of the ionised gas, at a corresponding position of temperature and ionisation potentials. A prerequisite is, that particularly one component of the mixture is present in ionised form that contributes to the electric capacity of the plasma. Accordingly, the conductivity must clearly depend from the concentration of the concerned gas ions or molecules and must permit quantitative information of the same after calibration.

The degree of ionisation of the components in dependency on temperature, particle density and ionisation energy is calculable in the case of the thermic ionisation. Accordingly, high ionisation degrees are obtained under conditions which prevail in a Diesel motor, in particular for soot due to its relatively low ionisation energy, so that a picking up the soot is possible by means of the conductivity of the combustion gas. On the one hand, this follows from the ionisation potentials of the most important combustion gas components of the Diesel engine, as stated in the table "ionisation potentials of inorganic and organic molecules" under "inorganic molecules". On the other hand, due to the fact that in aliphatic and aromatic hydrocarbons the ionisation energy decreases with increasing molecular size, as can be read in the table under "organic molecules", and that one can imagine that soot in principle is a progressed chain of an aromatic condensation series, which is also indicated by the content of hydrogen, one can appraise an ionisation energy which should be by about 2 to 3eV below anthracene of 7.23 eV, although more accurate values are not known, presumably because of the differences in the degree of condensation and the exact composition of the soot. However, it can be shown that even with the higher appraisal value of the ionisation energy of 5 eV, and taking into consideration the concentration relationships, there is still a sufficient potential distance for the soot pick up to the next slighlty ionisating component NO.

Even with a favorable position of the ionisating energies a quantitative component detection is only possible if a suitable measuring voltage is used, that means, that the voltage must be disposed in the saturation current area for the dependent gas discharge, so as to prevent a voltage conditioned ionisation with an avalanche type multiplication of the charge carriers, whereby as a consequence the electric conductivity of the plasma would no longer depend from the thermic ionisation of one component. However, ion current measurements are still possible, but they only permit the hitherto customary qualitative information about the operation of the combustion, like the determination of the point in time of ignition, whether there is a miss in the combustion or a knocking combustion is present.

A problem in all measurements in the motor are the considerable temperature and concentration differences which in spatial and timely view must be so determined that for the given operating process representative average values are obtained. This is performed by using a large measuring volume and by integration of the current and voltage paths. The measuring sensitivity can be improved in that for the discharge of the slow positive gas ions a larger negative electrode is used for the severe drift speeds of positive gas ions, counter ions and electrons.

TABLE

| Ionisating potentials of inorganic and organic molecules | |
|---|---|
| | eV |
| Inorganic molecules | |
| $H_2$ $H_2^+$ + e | 15.4 |
| $O_2$ oxygen | 12.2 |
| $N_2$ nitrogen | 16.8 |
| $H_2O$ water | 12.59 |
| CO carbon monoxide | 14.30 |
| $CO_2$ carbon dioxide | 13.79 |
| NO nitrogen monoxide | 9.5 |
| $NO_2$ nitrogen dioxide | 11.0 |
| Organic molecules | |
| Paraffines | |
| $CH_4$ methane | 12.98 |
| $C_2H_6$ ethane | 11.65 |
| $C_4H_{10}$ butane | 10.63 |
| $C_{10}H_{22}$ decane | 10.19 |
| Aromatic substances | |
| $C_6H_6$ benzene | 9.25 |
| $C_{10}H_8$ naphthaline | 8.12 |
| $C_{14}H_{10}$ anthracene | 7.23 |

BRIEF DESCRIPTION OF THE DRAWINGS

One exemplified embodiment is illustrated in the drawing and is explained in more detail in the subsequent description.

FIG. 1 is a section through a turbulence chamber of a Diesel engine,

FIG. 2 is a graphic illustration, wherein the average current is illustrated per single signal (combustion operation) at different speeds, and FIG. 3 finally illustrates, by way of example, an oscillographic diagram of the electric conductivity in dependency from the crank angle in a Diesel engine during full charge, a speed of 2000 rotations per minute and a soot content of 0.31 mg/l.

DESCRIPTION OF THE PREFERRED EMBODIMENT

FIG. 1 illustrates in a section the turbulence chamber 1 of a Diesel engine with the injection nozzle 2, the conduit 3 to the main combustion chamber, as well as the main combustion chamber 4. For example, a ceramic glow spark plug 5 extends into turbulence chamber 1 which on its tip supports an electric conductive layer 6 made of platinum, and subsequent thereto an electrical conductor 7 for contacting the conductive layer 6. A direct voltage of 250 V is applied between the electrical conductive tip 6 and the wall of the turbulence chamber 1. A measuring resistor 10 k$\Omega$ is disposed in the circuit for measuring the electric conductivity, so that the signal for the electric conductivity is maintained and evaluated as a voltage drop across this measuring resistor. An additional amplifier circuit permits an integration of the signals, so that simultaneously the amount of current can be registered in dependency from the time or from the amount of signals. If the evaluation is performed oscillographically (FIG. 3), a clear correlation is recognizeable between the electric signals and the soot contents of the exhaust gases and it is shown that this measuring device reacts very rapidly and without inertia to the operations in conjunction with the soot development in the combustion chamber. As can be seen from FIG. 2, the relationship is also very well met with respect to the quantitative needs, if after electronic integration of the signals the average amount of current per single signal is applied against the soot concentration. It can be seen that the values for 2000, 3000 and 4000 rotations per minutes hardly deviate from each other.

As the oscillographic diagrams illustrate (FIG. 3), the method is able, due to its inertia less mode of operation and its high sensitivity to resolve individual combustion operations to supply information about the combustion operation in view of the soot development in the combustion chamber. Consequently, among others, is possible to determine the center of combustion as the point in time of the maximum soot development, which coincides with the maximum light emission, and with the assistance of an injection initiation control (injection adjuster) to apply to certain points in time or °KW (crank angle), for example, 10° KW after the upper dead center ignition (oT) as an optimal adjustment. However, depending on the circumstances or requirements, the center of combustion can be changed in such a manner that the motor characteristics are improved in certain operating conditions, for example, warming up, high speed or push operation. Certain emissions, like noise, harmful materials (HC, $NO_x$, soot) are reduced or the specific fuel consumption is minimized. Advantageously, a signal is determined from all cylinders for the control functions, so as to compensate for motor caused combustion irregularities.

A further advantage in accordance with the method is, that the speed of the motor can be determined with the easily processed electrical signals and that all mentioned measuring functions are combinable with the start function without any extra expenditure by using modified glow pin spark plugs.

Finally, the exhaust return can be controlled with the stated method, which is the effective measure for limiting the $NO_x$-emission and for which an air amount meter is required today. Much more advantageous than this indirect method, whereby from the intake air amount the deduction is made concerning the decisive CO or soot concentration from the EGR-rate, would be the direct measuring of one of the two components. A direct and continuous measuring method is made available with the method in accordance with the invention with which soot can be rapidly and sensitively detected in the engine and that it is therefore usable for controlling the EGR rate. In comparison with the air amount measuring, the method in accordance with the invention is advantageous that it orients itself directly on a harmful component.

Due to the multifunctional characteristics all prerequisits are met for a comprehensive optimizing of the Diesel engine with respect to harmful emissions, noise development and specific fuel consumption.

We claim:

1. A method of measuring and/or controlling operating data, like soot content, engine speed, initiation of injection, and exhaust gas return of diesel internal combustion engines, the method comprising the steps of:

ionizing a component of gases with the lowest ionization potential at high temperatures in a combustion chamber of an internal combustion engine that experiences combustion operations to thereby form partially ionized gases;

applying a voltage to the partially ionized gases which produces a field intensity below 300 V/cm;

obtaining electrical measuring signals of the indicative of an electrical conductivity of the ionized component of the gases;

integrating the electrical measuring signals to define a curve plot of the electrical conductivity;

detecting a quantity of the ionized component of the gases that has the lowest ionization potentials based on the integrated electrical measuring signals, the detected quantity of the ionized component being associated with a portion of the electrical measuring signals and being indicative of an amount of soot formed during each of the combustion operations; and controlling at least one of the operating data of the internal combustion engine based on the portion of the integrated electrical measuring signals associated with the detected quantity of components.

2. The method as defined in claim 1, wherein the applying includes providing a glow pin spark plug having a tip, supporting an electrically conductive layer on the tip, arranging the electrically conductive layer in the combustion chamber, extending an electric conductor from the layer to outside the combustion chamber, and arranging an end of the electrical conductor outside the combustion chamber for electrical contacting so as to thereby provide a path for applying the measuring voltage to the partially ionized gases.

3. The method as defined in claim 1, wherein the applying includes applying a current and the voltage between two electrodes, the obtaining includes obtaining a plurality of the electrical measuring signals indicative of soot content of the partially ionized gases.

4. The method as defined in claim 1, further comprising:
determining an interval between the electrical measuring signals to thereby provide a contactless speed measurement of the internal combustion engine; and
determining a rotational speed of the internal combustion diesel engine based on the determined interval.

5. The method as defined in claim 1, further comprising:
determining a center of combustion from a point in time corresponding to maximum soot development as reflected by the detecting, said controlling further including controlling an injection initiation by setting a crank angle in dependence on engine operating conditions, noise and harmful substance emission requirements, and on the center of combustion as previously determined.

6. The method as defined in claim 1, wherein said controlling further including controlling exhaust gas return by feeding exhaust gas into an intake line until the integration of the electrical measuring signals indicates a formation of a more severe soot formation.

* * * * *